United States Patent [19]

Seki et al.

[11] Patent Number: 5,107,138
[45] Date of Patent: Apr. 21, 1992

[54] INTEGRATED CIRCUIT WITH BATTERY SERVING AS POWER SOURCE HAVING CMOS ANALOG AND DIGITAL CIRCUITS AND REGULATED STEPPED UP VOLTAGE SOURCE

[75] Inventors: Yoichi Seki; Hiroyuki Saito; Michio Taniwaki; Teruyo Hayakawa, all of Yotsukaido, Japan

[73] Assignee: Seikosha Co., Ltd., Japan

[21] Appl. No.: 335,199

[22] Filed: Apr. 7, 1989

[30] Foreign Application Priority Data

Apr. 8, 1988 [JP] Japan .................. 63-86761

[51] Int. Cl.⁵ .................. H03K 3/01; H03K 3/26
[52] U.S. Cl. .................. 307/296.1; 307/296.3; 307/475; 307/303; 307/296.6
[58] Field of Search .......... 307/475, 75, 296.1, 307/296.3, 303, 110, 151, 296.6; 363/60, 101

[56] References Cited

U.S. PATENT DOCUMENTS

| | | | |
|---|---|---|---|
| 3,818,484 | 6/1974 | Nakamura et al. | 363/60 |
| 3,955,353 | 5/1976 | Astle | 363/60 |
| 4,053,821 | 10/1977 | Hose, Jr. et al. | 363/60 |
| 4,268,763 | 5/1981 | Johnson | 307/296.3 |
| 4,279,010 | 7/1981 | Morihisa | 363/60 |
| 4,683,382 | 7/1987 | Sakurai et al. | 307/296.3 |
| 4,730,122 | 3/1988 | Preibelbis et al. | 307/75 |

OTHER PUBLICATIONS

"Regulated On-Chip Supply Voltage Source for MOSFET Integrated Circuits", IBM Technical Disclosure Bulletin, by Concannon et al, vol. 24, No. 9, Feb. 1982.

Primary Examiner—David C. Nelms
Assistant Examiner—Richard Roseen
Attorney, Agent, or Firm—Bruce L. Adams; Van C. Wilks

[57] ABSTRACT

An integrated circuit comprises a logic circuit connectable to a battery power supply to energize the logic circuit. A converter generates a stepped up voltage supply from the battery power supply and an analog circuit is receptive of the stepped up voltage supply for controlling the operation of other circuitry. The analog circuit and the logic circuit comprise CMOS transistors integrated on the same chip.

1 Claim, 2 Drawing Sheets

INTEGRATED CIRCUIT WITH BATTERY SERVING AS POWER SOURCE HAVING CMOS ANALOG AND DIGITAL CIRCUITS AND REGULATED STEPPED UP VOLTAGE SOURCE

TECHNICAL FIELD OF THE INVENTION

The present invention generally relates to an integrated circuit with a battery serving as a power source, and more particularly, to an integrated circuit with a battery serving as a power source, which includes a logic circuit operable by a battery source such as a microprocessor (MPU) and an analog circuit operable by a stepped up voltage source stepped up from the battery source, these circuits being integrated on the same chip.

DESCRIPTION OF THE RELATED ART

A control apparatus for a camera, which has heretofore been adopted as shown FIG. 2, consists of a logic circuit IC1 operable by a battery source 1 and an analog circuit IC2 which uses the same battery source 1 under a different load condition from the logic circuit IC1.

Logic circuit IC1 is supplied with a voltage $V_{DD}$ and a voltage Vss derived as a reference voltage from battery source 1. Logic circuit IC1 is composed of an operation control circuit 13 operable by the battery source 1 and formed of C-MOS transistors (PMOS and NMOS transistors connected in a complementary configuration), inverters IV1 to IV3 and a P-channel MOS transistor Q6. Operation control circuit 13 is connected to a perimetrical or load circuit 16 operable by large electric currents associated with operations of measuring the light and distance, winding a film and operating a shutter.

On the other hand, the analog circuit IC2, which likewise utilizes the battery source 1 under a different load condition from logic circuit IC1, is constituted by a voltage detector for reset which consists of a comparator A2, and resistances R3 and R4, a voltage detector for the perimetrical circuit which consists of a comparator A3, and resistances R5 and R6, and a reference voltage generator 5. It should be noted that: a transistor 14 is defined as a power source switch; resistances 14a and 14b are bias resistances of the transistor 14; a transistor 15 comprises an element for actuating the transistor 14; resistances 15a and 15b are bias resistances of the transistor 15; and a resistance 13a is connected to cause an input of the inverter IV1 to assume the H level in a normal state and to assume the L level when closing the start switch 2.

Inverter IV4 and reset capacitor 12 are provided for reset signals of the operation control circuit 13.

Analog circuit IC2 typically formed of bipolar transistors is supplied with electric power from source voltage $V_{DD}$ of the battery source 1 via transistor 14. When the start switch 2 is depressed, transistor 15 works through inverter IV1 and resistance 15b. Upon the operation of the transistor 15, a bias current flows in the base of transistor 14, thereby turning ON transistor 14. Subsequently, electric power is supplied from the power source to the individual components of the analog circuit IC2, with the result that comparators A2 and A3 and reference voltage generator 5 are operable.

When source voltage $V_{DD}$ of the battery source 1 is in a normal state, the output of comparator A2 constituting the reset voltage detector assumes the L level. On the other hand, P-channel MOS transistor Q6 is turned ON under control of inverter IV2, as a result of which reset capacitor 12 begins to be charged with electricity. When a charging potential of the reset capacitor 12 reaches a predetermined voltage, the resetting of the operation control circuit 13 is released by dint of the output of inverter IV3. Operation control circuit 13 in turn performs a predetermined arithmetic operation and processing.

If source voltage $V_{DD}$ of the battery source 1 becomes abnormal, the output of comparator A2 constituting the voltage detector dedicated to the perimetrical circuit 16 assumes the H level. Operation control circuit 13 remains reset and is unable to function, because the output of inverter IV4 continues to be at the L level.

The voltage detector for the perimetrical circuit 16, which is composed of comparator A3 and resistances R5 and R6, is not allowed to operate by a voltage lower than the minimum voltage capable of assuring the operations of perimetrical circuit 16 which is prescribed by resistances R5 and R6 as well as by reference voltage generator 5.

PROBLEMS TO BE SOLVED BY THE INVENTION

Where in this type of control apparatus designed for a camera the voltage detector and the analog circuit such as a voltage detector dedicated to the perimetrical circuit are formed of C-MOS ICs, this arrangement requires a voltage which is 1.5 times as high as the minimum operational voltage of 1.2 V of the logic circuit. In this case, the minimum guaranteed voltage is approximately 2.4 V. The logic circuit IC1 is normally composed of C-MOS transistors, while the analog circuit IC2 consists of bipolar transistors, and hence these two circuits are constituted by separate integrated circuits. For this reason, there arises a problem of causing a decline in spatial factor of the printed circuit board or the like. In addition, a connecting circuit for providing coincidence of interfaces of the two circuits consisting of the C-MOS transistors and bipolar transistors is disadvantageously needed.

SUMMARY OF THE INVENTION

Accordingly, it is a primary object of the present invention to eliminate the foregoing drawbacks and to provide an integrated circuit with a battery serving as a power source which is capable of remarkably ameliorating an integrated density as compared with an integrated circuit constituted by bipolar transistors, reducing the number of wires of a printed circuit board, facilitating the setting of design conditions and improving the reliability with a decreased number of components.

MEANS FOR SOLVING THE PROBLEMS

To accomplish the foregoing object, according to one aspect of the invention, there is provided an integrated circuit with a battery serving as a power source, comprising: a logic circuit operable by a battery source; a converter for generating a stepped up voltage source stepped up from the battery source; and an analog circuit operable by the stepped up voltage source, characterized in that the logic and analog circuits are composed of C-MOS transistors and are integrated on the same chip.

DETAILED DESCRIPTION OF THE INVENTION

A preferred embodiment of the present invention will hereinafter be explained with reference to the accompanying drawings when applied to an integrated circuit with a battery serving as a power source for use with a camera.

Figure 1:
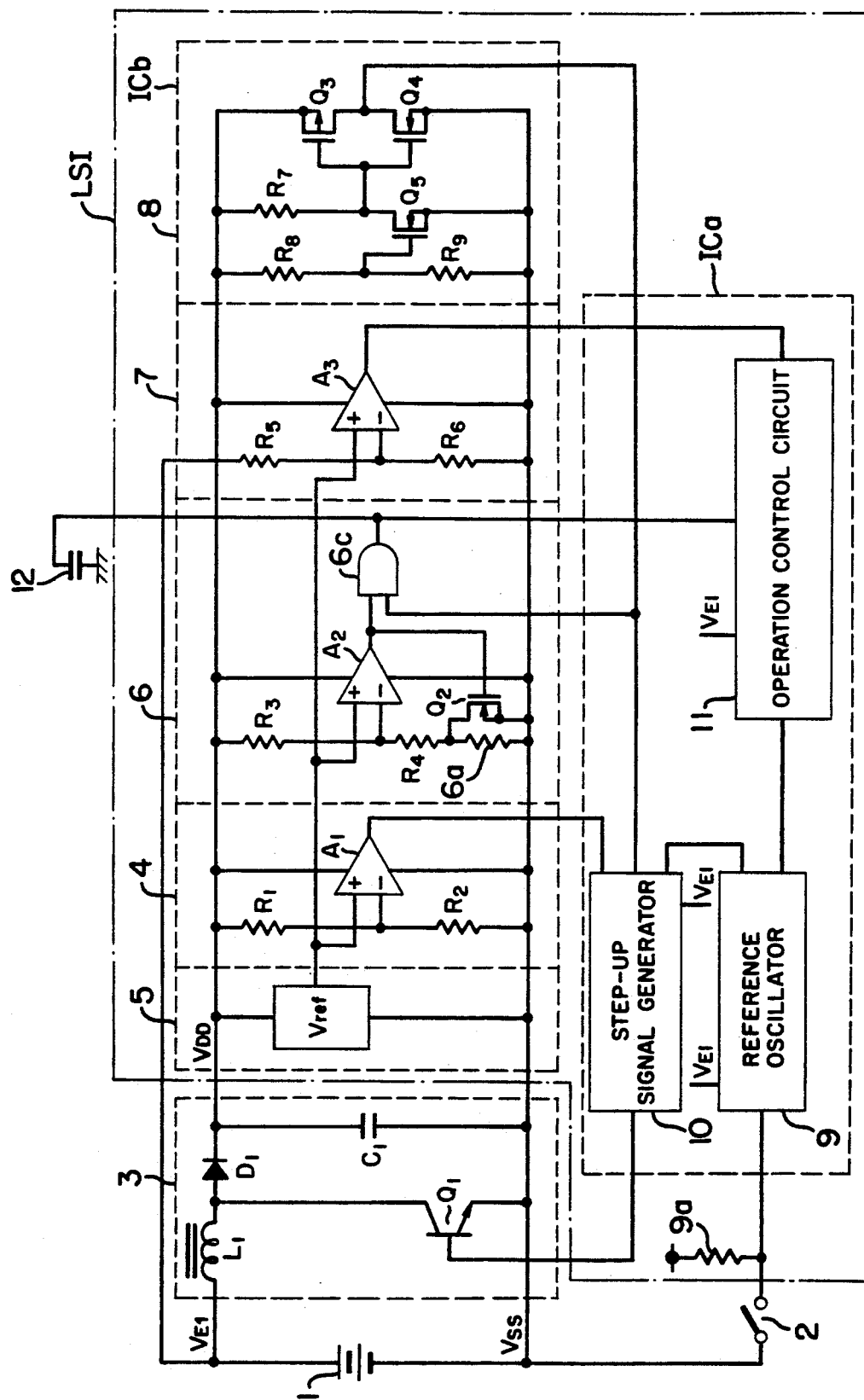
FIG. 1 is a circuit diagram depicting an integrated circuit with a battery serving as a power source for use with a camera in an embodiment of the present invention.
Figure 2:
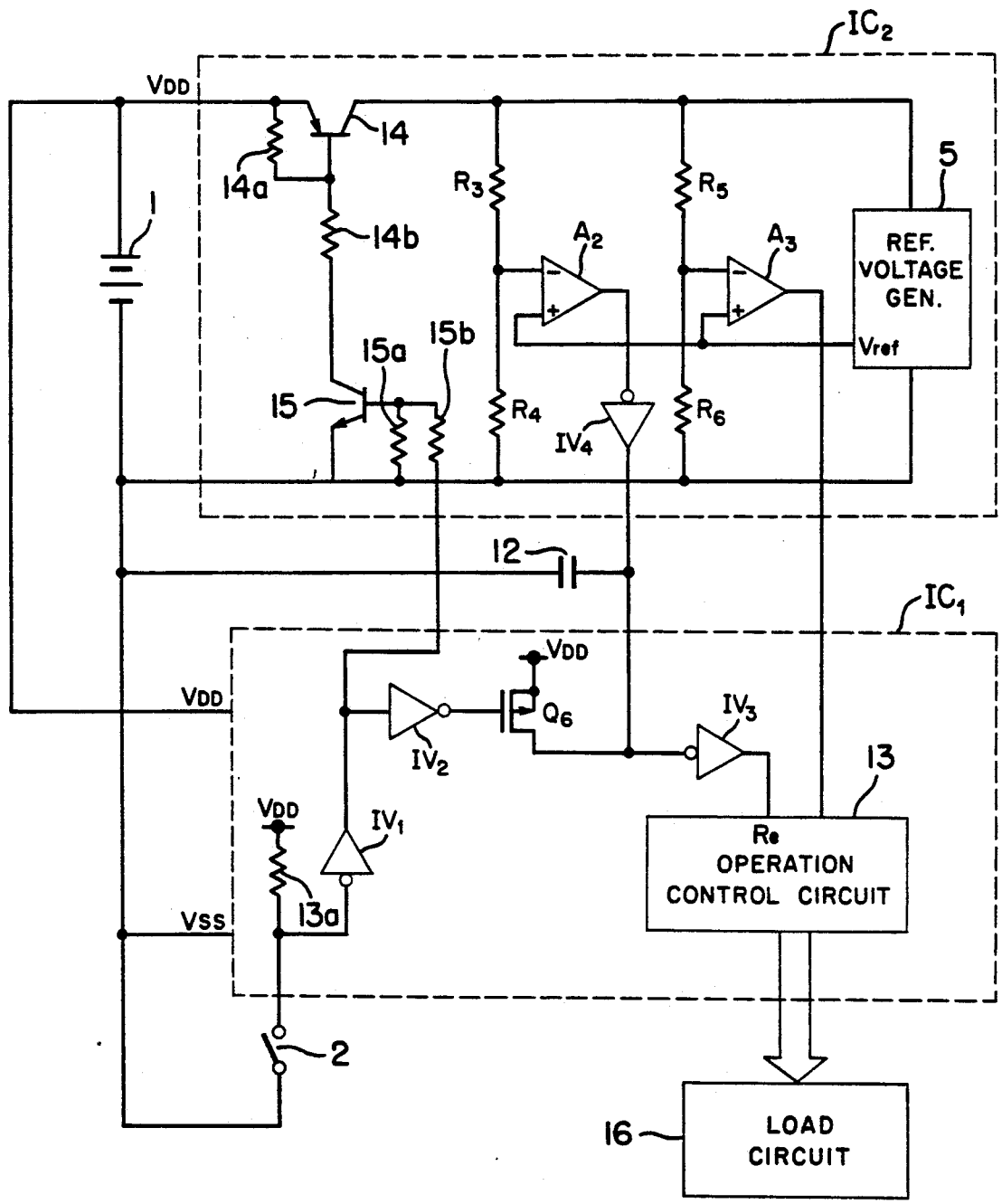
FIG. 2 is a diagram illustrating a circuit of a conventional control apparatus designed for a camera.

The integrated circuit having the battery defined as a power source in accordance with the invention, as depicted in FIG. 1, includes: a converter 3 for generating a stepped up voltage source $V_{DD}$ stepped up from a source voltage $V_{E1}$ of a battery source 1; a logic circuit ICa operable by source voltage $V_{E1}$; and an analog circuit ICb operable by stepped up voltage source $V_{DD}$ obtained by stepping up the source voltage $V_{E1}$.

A (+) side of the battery source 1 is connected to one end of coil L1, while a (−) side thereof is connected to a reference voltage Vss. Converter 3 consists of the coil L1, a diode D1, a smoothing capacitor C1 and a transistor Q1. An anode of the diode D1 is connected to the other end of coil L1. Capacitor C1 is connected between a cathode of the diode D1 and reference voltage Vss. The collector of transistor Q1 is linked to the connecting point between coil L1 and diode D1, the emitter of which is connected to reference voltage Vss, and the base thereof is connected to an output of a step-up signal generator 10 of logic circuit ICa.

Integrated on the same chip LSI are the analog circuit ICb and logic circuit ICa which are constituted by C-MOS transistors.

Logic circuit ICa comprises an operation control circuit 11, a reference oscillator 9 and a step-up signal generator 10.

Analog circuit ICb comprises a reference voltage generator 5, a step-up voltage detector 4, a reset voltage detector 6, a battery voltage detector 7 and an analog circuit operational voltage detector 8.

Step-up voltage detector 4, reset voltage detector 6 and battery voltage detector 7 each have comparators A1 through A3 and are adapted to detect a reference voltage generated by reference voltage generator 5 and also voltages corresponding to ratios between resistances R1 and R2, between resistances R3 and R4 (including a resistance 6a), and between resistances R5 and R6.

The output of the comparator A1 of step-up voltage detector 4 is connected to the input of step-up signal generator 10, in which configuration the output of the step-up signal generator 10 increases when the step-up voltage is lower than the predetermined level.

The output of comparator A2 of the reset voltage detector 6 is connected via an AND circuit 6c to a reset capacitor 12.

Reset voltage detector 6 has an N-channel MOS transistor Q2 by which the output of comparator A2 is changed over from the L level to the H level and vice versa. Reset voltage detector 6 is arranged to have a hysteresis characteristic in which it is hard to be reset due to a difference between the voltage levels.

Battery voltage detector 7 is adapted to directly detect the minimum voltage of the battery source 1 so as to not cease the operation of the operation control circuit 11 by large electric currents.

The output points of the C-MOS transistors Q3 and Q4 of analog circuit operational voltage detector 8 are connected to the input of the step-up signal generator 10.

The greatest voltage is detected in the step-up voltage detector 4; an intermediate voltage is detected in the reset voltage detector 6; and the least voltage is detected in the analog circuit operational voltage detector 8.

Note that stepped up voltage source $V_{DD}$ is supplied via lines (not illustrated) to perimetrical circuits (not shown) for effecting the operations of measuring the light and distance, winding a film and operating a shutter. The perimetrical circuits in turn control the operation control circuit 11 through an I/O terminal (not shown).

When turning ON start switch 2, the operation control circuit 11, step-up signal generator 10 and reference oscillator 9 of logic circuit ICa are caused to work by stepped up voltage source $V_{DD}$ substantially equal to source voltage $V_{E1}$. Reference oscillator 9 initiates its oscillation by dint of stepped voltage source $V_{DD}$ and outputs to step-up signal generator 10 a signal having a fixed frequency required for the step-up. At this time, if the voltage outputted from the converter 3 does not reach a voltage level at which the analog circuit ICb is operable, a signal assuming the L level is transmitted from the analog circuit operational voltage detector 8 to the operation control circuit 11 via step-up signal generator 10 and AND circuit 6c of the reset voltage detector 6. As a result, the operation control circuit 11 does not function, while step-up signal generator 10 is subjected to control by the L-level signal.

Step-up signal generator 10 receives the L-level signal from the analog circuit operational voltage detector 8 and outputs to converter 3 a signal having a fixed duty cycle, i.e., a fixed frequency at which the converter 3 can effect the step-up with the maximum capability. Converter 3 in turn initiates the step-up. When the output voltage of the converter 3 comes to a predetermined value, the output of the analog circuit operational voltage detector 8 is changed over from the L level to the H level, thereby making the outputs of the respective analog circuits available. Then it follows that converter 3 is controlled by step-up voltage detector 4. Step-up voltage detector 4 compares the voltage stepped up by converter 3 with a voltage to be outputted from the reference voltage generator 5. If the step-up voltage does not exceed a predetermined level, a step-up signal is outputted from the step-up signal generator 10 to converter 3, thus performing the step-up. If the step-up voltage exceeds a predetermined level, e.g., 5 V, the step-up signal ceases to be outputted from the step-up signal generator 10, thus stopping the step-up.

Reset voltage detector 6 is intended to detect a voltage of an intermediate level between the voltage level detected by the analog circuit operational voltage detector 8 and the voltage level detected by the step-up voltage detector 4. Hence, when the step-up voltage increases above the voltage level detected by the reset voltage detector 6, the output of the reset voltage detector 6 is changed over from the L level to the H level, whereby reset capacitor 12 starts to be charged with electricity. Subsequently, the predetermined arithmetic and controlling operations are effected by releasing the reset of the operation control circuit 11. When the step-up voltage is lower than the voltage level detected by the reset voltage detector 6, the operation control circuit 11 is brought into a resetting state and no operation is thereby performed, because the output of the reset voltage detector 6 assumes the L level. As discussed above, the reset voltage detector 6 has a hysteresis characteristic wherein the resetting is hard to be released and effected because of a difference between the voltages which are changed over from the L level to the H level and vice versa.

It is to be noted that the battery voltage detector 7 serves to detect whether the voltage of the battery source 1 is capable of providing sufficient operations or not, while the operation control circuit 11 controls the perimetrical circuits by utilizing the results thereof.

On the occasions of measuring the light and distance, winding the film and operating the shutter, these circuit are supplied with large electric currents and the voltage of battery source 1 drops down in some cases. At this time, the step-up voltage is unable to hold the predetermined level, and it follows that the reset voltage detector 6 works and the control ceases during the operation. Battery voltage detector 7 is provided in order to steer clear of this drawback.

Even if the start switch 2 is turned OFF during the processing, the operation does not revert to a stand-by state unless the processing has been all performed by operating the individual circuits on the integrated chip LSI.

In the foregoing illustrative embodiment, the description has touched on the integrated circuit with the battery serving as a power source for use with a camera. The present invention can, however, equally be applied to other integrated circuits in which their power sources involve batteries used for appliances other than a camera.

EFFECTS OF THE INVENTION

As can be clarified from the description given above, the integrated circuit with the battery serving as a power source according to the present invention, comprises: the logic circuit operable by the battery source; the converter for generating the stepped up voltage source stepped up from the battery source; and the analog circuit operable by the stepped up voltage source, these logic and analog circuits being composed of C-MOS transistors and integrated on the same chip. With this arrangement, it is possible to remarkably improve the integrated density as compared with the bipolar transistor-based integrated circuit and reduce the number of wires of the printed circuit board. By virtue of the configuration that the analog and logic circuits are integrated on the same chip, the conditions in design can be set with greater facility, and the reliability can also be ameliorated with a decreased number of components.

We claim:

1. An integrated circuit with a battery source serving as a power source, comprising: a logic circuit operable by a battery source; a converter for generating a regulated stepped up voltage source stepped up from said battery source; and a comparator used to regulate the stepped up voltage source and operable by said stepped up voltage source, wherein said logic circuit and said comparator are composed of C-MOS transistors and are integrated on the same chip.

* * * * *